United States Patent
Furrer et al.

(10) Patent No.: US 9,035,504 B2
(45) Date of Patent: May 19, 2015

(54) BRUSHLESS DIRECT-CURRENT MOTOR HAVING CURRENTLESS STOPPAGE

(75) Inventors: Roman Furrer, Eschenbach (CH); Daho Taghezout, Morges (CH)

(73) Assignee: BELIMO HOLDING AG, Hinwil (CH)

( * ) Notice: Subject to any disclaimer, the term of this patent is extended or adjusted under 35 U.S.C. 154(b) by 518 days.

(21) Appl. No.: 13/503,218

(22) PCT Filed: May 27, 2010

(86) PCT No.: PCT/CH2010/000138
§ 371 (c)(1),
(2), (4) Date: Jul. 2, 2012

(87) PCT Pub. No.: WO2011/047488
PCT Pub. Date: Apr. 28, 2011

(65) Prior Publication Data
US 2012/0267976 A1     Oct. 25, 2012

(30) Foreign Application Priority Data
Oct. 23, 2009  (CH) ..................... 1624/09

(51) Int. Cl.
H02K 21/12     (2006.01)
H02K 37/12     (2006.01)
H02K 7/106     (2006.01)
(Continued)

(52) U.S. Cl.
CPC .............. H02K 7/106 (2013.01); H02K 1/2786 (2013.01); H02K 21/02 (2013.01)

(58) Field of Classification Search
CPC ..... H02K 21/12; H02K 21/22; H02K 1/2786; H02K 37/12; H02K 7/114; H02K 37/24

USPC ............ 310/156.01, 156.51, 156.26, 156.35, 310/49.55
See application file for complete search history.

(56) References Cited

U.S. PATENT DOCUMENTS 5,465,019 A * 11/1995 Kliman ..................... 310/156.04
6,095,677 A    8/2000 Karkos, Jr. et al.
(Continued)

FOREIGN PATENT DOCUMENTS

DE        43 06 327 A1    9/1994
DE        101 25 836 A1   11/2002
(Continued)

OTHER PUBLICATIONS

Machine translation of DE 10125836 A1 (Nov. 2002).*

*Primary Examiner* — Michael Andrews
(74) *Attorney, Agent, or Firm* — Sughrue Mion, PLLC (57) ABSTRACT

The invention relates to a brushless direct-current motor (1), comprising a stator (2), a rotor cup (30) that revolves around the stator (2) and has a plurality of permanent-magnet poles (N, S), and a detent torque plate (4) that is connected to the stator (2) and has several pole shoes (41) for generating a detent torque that brings the revolving rotor cup (30) into a detent position. The pole shoes (41) are each arranged in the detent position between two adjacent poles (N, S) of the revolving rotor cup (30) to form a magnetic short circuit. The detent torque plate (4) is arranged substantially outside of the magnetic rotating field produced by the stator (2) during operation, whereby the production of the detent torque is decoupled from the electrical behavior of the brushless direct-current motor (1) and the power of the brushless direct-current motor (1) is not substantially influenced by the presence of the detent torque plate (4).

12 Claims, 5 Drawing Sheets

(51) Int. Cl.
  *H02K 1/27*   (2006.01)
  *H02K 21/02*  (2006.01)
  *H02K 21/22*      (2006.01)
  *H02K 37/24*      (2006.01)

(56) References Cited

U.S. PATENT DOCUMENTS

| | | |
|---|---|---|
| 6,853,106 B2 | 2/2005 | Fujiwara et al. |
| 2002/0135242 A1* | 9/2002 | Kawai .................. 310/49 R |
| 2006/0053577 A1* | 3/2006 | Moein et al. ............ 310/156.26 |
| 2007/0090710 A1* | 4/2007 | Chen .................... 310/156.26 |
| 2007/0132324 A1 | 6/2007 | Coupart |
| 2007/0152521 A1* | 7/2007 | Park .................... 310/156.26 |

FOREIGN PATENT DOCUMENTS

| | | | |
|---|---|---|---|
| DE | 10125836 A1 * | 11/2002 | ............ H02K 7/112 |
| DE | 20 2004 018 822 U1 | 2/2005 | |
| DE | 10 2004 014 986 A1 | 11/2005 | |
| EP | 1796245 A1 | 6/2007 | |
| RU | 2231200 C2 | 9/2003 | |
| RU | 2255641 C2 | 7/2005 | |

* cited by examiner

BRUSHLESS DIRECT-CURRENT MOTOR HAVING CURRENTLESS STOPPAGE

CROSS REFERENCE TO RELATED APPLICATIONS

This application is a National Stage of International Application No. PCT/CH2010/000138 filed on May 27, 2010, which claims priority from Swiss Patent Application No. 1624/09, filed on Oct. 23, 2009, the contents of all of which are incorporated herein by reference in their entirety.

TECHNICAL FIELD

The present invention relates to a brushless direct-current motor with currentless stoppage. The present invention relates in particular to a brushless, three-phase, permanent-magnet direct-current motor with currentless stoppage, which has a stator and a cup rotor running peripherally around the stator with a plurality of permanent-magnet poles.

PRIOR ART

In order to bring an electric motor, which is out of operation and to which no electrical energy is being supplied, into a desired locking position, for example in order to prevent a flap driven by a drive from moving or a valve from rotating, inhibiting springs are typically used which press permanently onto the transmission of the drive and as a result prevent, as far as possible, a rotation of the motor in the deenergized state. The use of inhibiting springs is inexpensive, but has the disadvantage that they brake the motor even during operation and therefore result in power losses. As a result, the maximum inhibition which can be produced by an inhibiting spring is limited. Owing to the mechanical contact between the inhibiting spring and the transmission, undesirable and often disruptive noise also occurs during operation. It is moreover extremely difficult to produce inhibition of the drive with inhibiting springs within a defined tolerance limit, which, depending on the manufacturing strategy, results in drives which are often braked to an excessive extent during operation or which have an often insufficient inhibition when out of operation.

There are two magnetic fields in an electric motor with permanent magnets. One of these magnetic fields is produced by the permanent magnet and is also present in the deenergized state. A second of the magnetic fields is produced by coils through which current flows. The interaction between the two magnetic fields causes the rotary movement and the torque generation of the motor. The presence of ferromagnetic material (iron) changes the orientation of the magnetic field.

DE 20 2004 018 822 U1 describes a coreless and brushless electric motor with currentless stoppage, which comprises a flat brake disk consisting of ferromagnetic material. A permanent magnet is fitted on the rotor shaft and is surrounded by a coil at a distance (air gap), said coil being fastened on the inner wall of the housing shell and extending from the housing base to the housing cover. The brake disk is fitted on the inner side of the housing cover and interacts with the magnetic field of the rotating permanent magnet in such a way that the rotor is held in a defined locking position when the motor is switched off. Since the brake disk is within the coil region and therefore also in the magnetic field of the coil of the stator, however, it also influences the interaction between the two magnetic fields during operation and thus decreases the performance of the motor.

DESCRIPTION OF THE INVENTION

An object of the present invention is to propose a brushless direct-current motor with currentless stoppage, which does not have at least some of the disadvantages of the known electric motors. It is in particular an object of the present invention to propose a brushless direct-current motor with currentless stoppage which comprises a stator and a cup rotor running peripherally around the stator with a plurality of permanent-magnet poles.

In accordance with the present invention, these aims are achieved in particular by the elements of the independent claim. Further advantageous embodiments also result from the dependent claims and the description.

The abovementioned aims are achieved by the present invention in particular by virtue of a (brushless) synchronous motor, comprising a stator and a cup rotor running peripherally around the stator with a plurality of permanent-magnet poles, being provided, in which a cogging torque lamination which is connected to the stator and has a plurality of pole shoes is provided for generating a cogging torque bringing the peripherally running cup rotor into a locking position, the pole shoes of the cogging torque lamination being arranged in such a way that, in the locking position, they each form a magnetic short circuit between two adjacent poles of the peripherally running cup rotor. By virtue of the generation of the cogging torque by means of the cogging torque lamination, the inhibiting spring can be dispensed with completely or can at least be significantly reduced, with the result that, during operation, there is no or only a small reduction in power owing to the inhibition, and, in addition, a cogging torque is generated which, within a narrow tolerance range, corresponds to a defined rated value and overall provides the possibility of increased inhibition in comparison with an inhibiting spring. The generation of the cogging torque by a cogging torque lamination with pole shoes which produce a magnetic short circuit between adjacent poles of a peripherally running cup rotor furthermore provides the possibility of a particularly advantageous arrangement of the cogging torque lamination outside the rotating magnetic field produced by the stator during operation. As a result, an influence of the electrical response of the brushless direct-current motor and in particular a power-reducing influence on the brushless direct-current motor owing to the presence of the cogging torque lamination are prevented.

Preferably, the cogging torque lamination is arranged substantially outside the magnetic field produced by the stator during operation. Depending on the embodiment, the cogging torque lamination is arranged in a plane perpendicular to the axis of rotation above or below the stator. In a variant embodiment, the brushless direct-current motor comprises a plurality of cogging torque laminations with identical configurations, at least one of the cogging torque laminations being arranged in a plane perpendicular to the axis of rotation above the stator, and at least one of the cogging torque laminations being arranged in a plane perpendicular to the axis of rotation below the stator. Owing to the positioning of the cogging torque lamination above and/or below the stator, the cogging torque lamination is arranged in such a way that it has no influence on the magnetic field of the coils of the stator. As a result, the magnetic circuit which is responsible for the electrical response of the motor during operation is not impaired by the presence of the cogging torque lamination. The cogging torque lamination is therefore outside the magnetic circuit occurring during operation of the brushless direct-current motor, said magnetic circuit being closed by the pole shoes of the stator via an air gap, the permanent magnets of the rotor and a return path via the cup rotor. Owing to the positioning of the cogging torque lamination above and/or below the stator, the generation of the cogging torque can thus be decoupled from the electrical response of the motor, and the electrical response of the brushless direct-current motor is not substantially influenced by the presence of the cogging torque lamination. It is thus possible to produce inhibiting torques which are greater by factors in comparison with inhibiting springs and which do not produce any power losses in practice during motor operation.

In a preferred variant embodiment, the cogging torque lamination is arranged in such a way that it is covered by the permanent magnets on that end side of said cogging torque lamination which faces the permanent magnets. The cogging torque lamination is thus arranged completely in the main magnetic flux of the permanent magnets.

Preferably, the cogging torque lamination comprises a number of pole shoes which corresponds to an integral divisor or multiple of the number of poles of the peripherally running cup rotor.

In a variant embodiment, the pole shoes are configured in the form of a T, and their crossbars are each arranged on a circle which is concentric to the peripherally running cup rotor. In the locking position, the crossbars of the T-shaped pole shoes each extend over a subregion of the permanent magnets of two adjacent poles of the peripherally running cup rotor.

Preferably, the cogging torque lamination is fitted to an axial stator mount of the stator.

The peripherally running cup rotor preferably comprises permanent magnets consisting of hard-magnetic materials, such as neodymium-iron-boron (NdFeB), for example, and the cogging torque lamination consists of a magnetically conductive material, for example, in particular of iron. However, it can also consist of other soft-magnetic, semi-hard-magnetic or hard-magnetic materials.

In one variant embodiment, the brushless direct-current motor comprises a plurality of cogging torque laminations with identical configurations which are arranged one above the other so as to cover one another.

BRIEF DESCRIPTION OF THE DRAWINGS

An embodiment of the present invention will be described below with reference to an example. The example of the embodiment is illustrated by the following attached figures, in which.

APPROACHES TO IMPLEMENTING THE INVENTION

Figure 1:
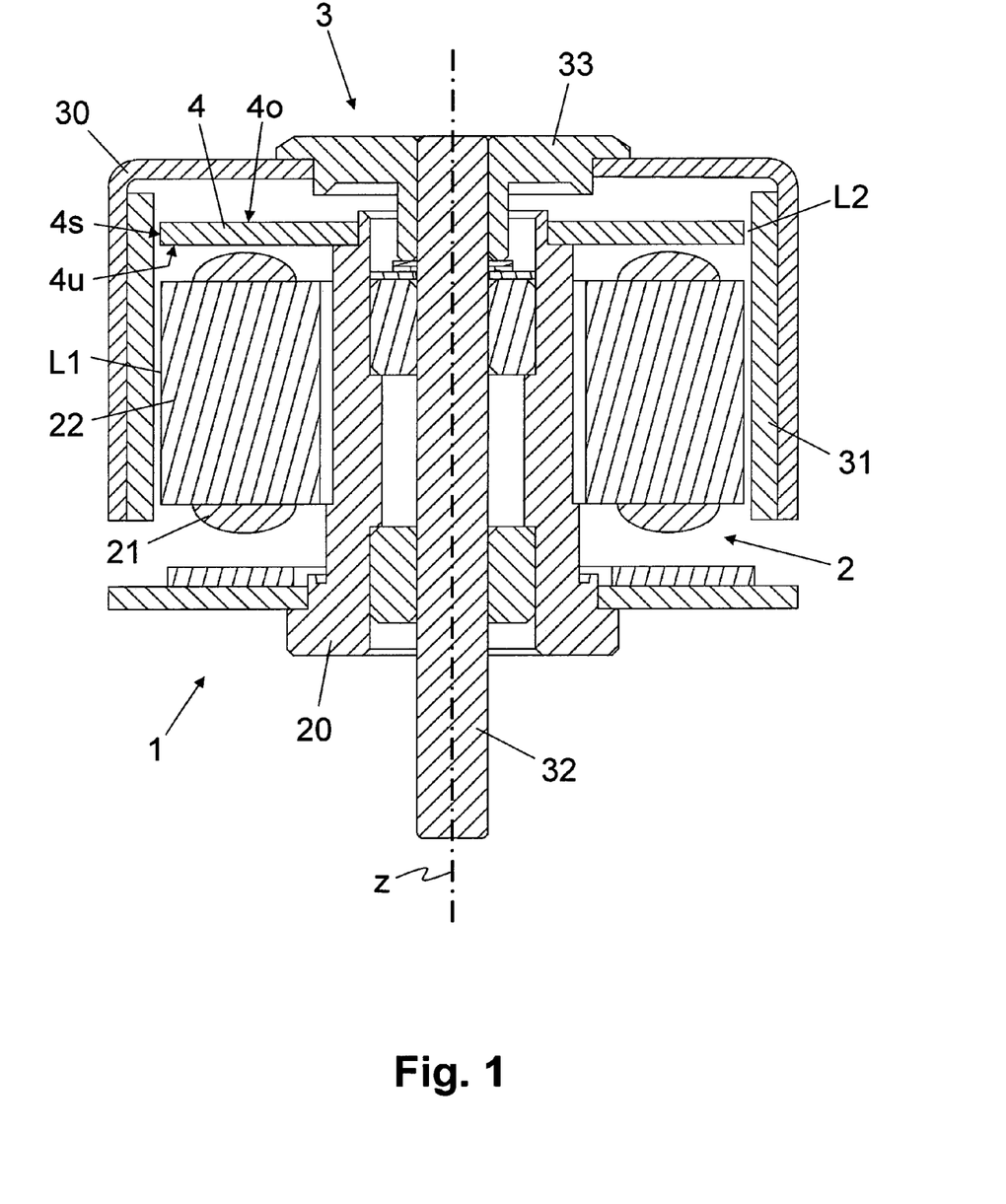
FIG. 1 shows an axial cross section through an exemplary embodiment of a brushless direct-current motor with a peripherally running cup rotor and a cogging torque lamination arranged above the stator.

In FIG. 1, reference symbol 1 denotes a brushless direct-current motor with a stator 2 and a peripherally running rotor 3 with a plurality of permanent-magnetic poles N, S formed by permanent magnets 31. The brushless direct-current motor 1 has in particular a three-phase configuration and is configured as a plug-on drive and is used in heating, ventilation and air-conditioning technology, for example for opening and closing flaps, with it being used with large transmissions with a transmission ratio of 1:5000, for example.

Figure 2:
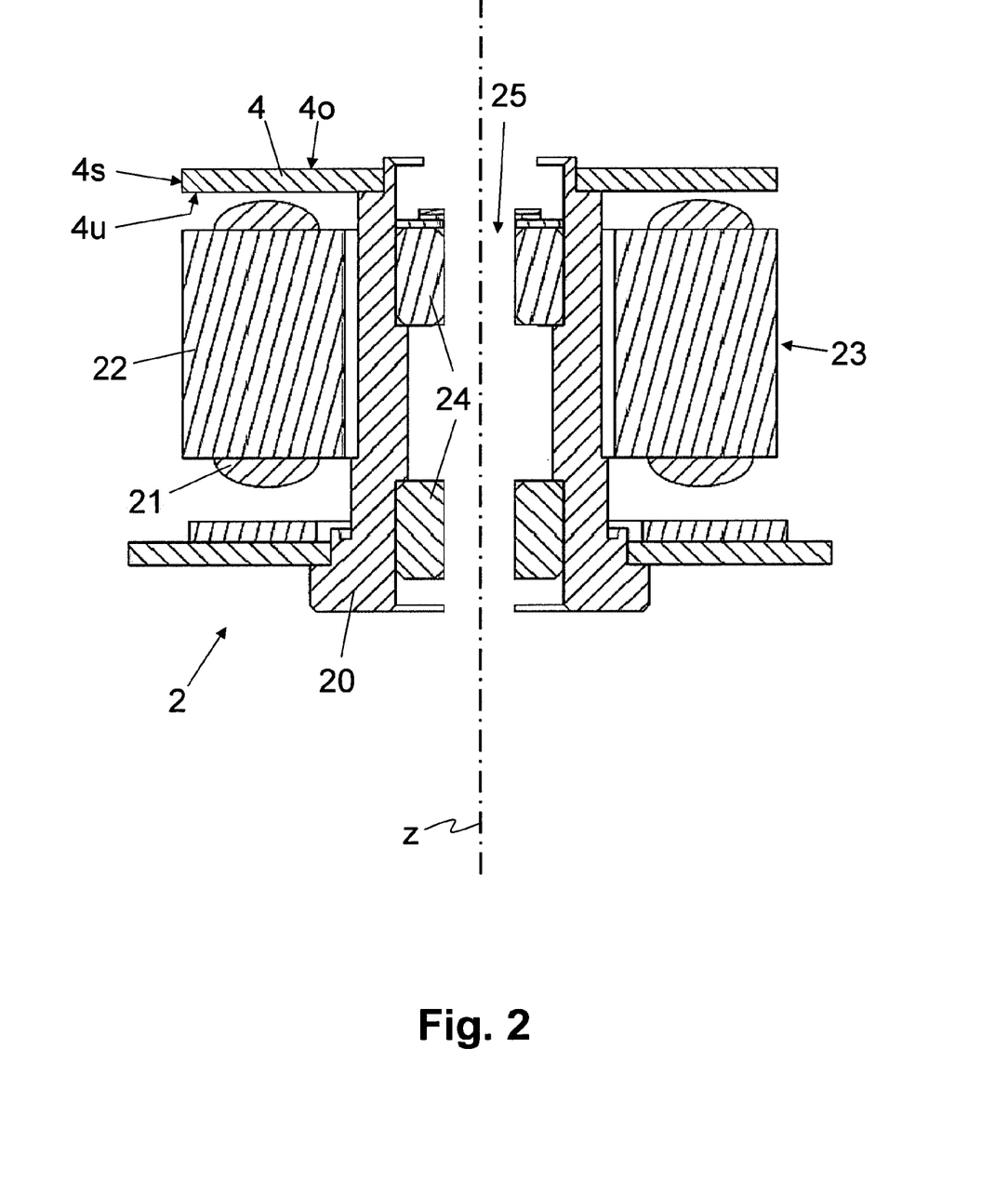
FIG. 2 shows an axial cross section through the stator of the brushless direct-current motor shown in FIG. 1.
Figure 3:
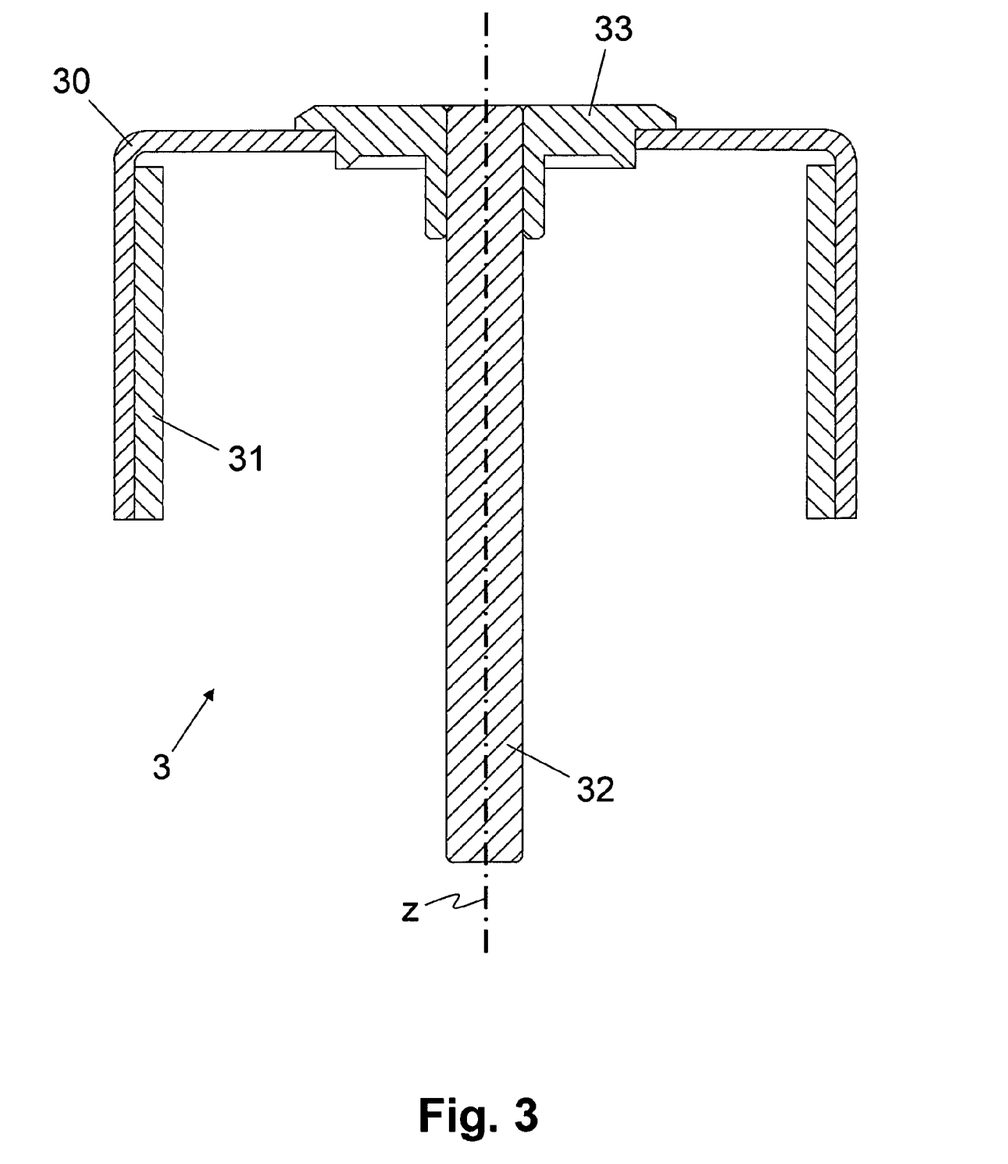
FIG. 3 shows an axial cross section through the peripherally running cup rotor of the brushless direct-current motor shown in FIG. 1.

The stator 2 comprises a stator mount 20, which is substantially hollow-cylindrical and rotationally symmetrical with respect to the axis of rotation z. The stator mount 20 has a lower end region for fixing to a supporting apparatus and an upper end region opposite this. As is illustrated in FIGS. 1 and 2, the stator 2 comprises a plurality of pole shoes 23, which are fitted on the stator mount 20 and are arranged rotationally symmetrically with respect to the stator mount 20 and are each formed from stator laminations 22 and stator coils 21, for producing the moving rotating magnetic field during operation of the brushless direct-current motor 1. The pole shoes 23 each have a center axis, which runs perpendicular to the axis of rotation z, said center axes intersecting one another at a common point of intersection on the axis of rotation z.

In addition, a cogging torque lamination 4 is fitted to the stator mount 20 and is preferably arranged and aligned in the upper end region, above the stator 2, in particular above the pole shoes 23 of the stator 2, i.e. above the stator laminations 22 and the coils 21, in a plane perpendicular to the axis of rotation z. In one variant embodiment, the cogging torque lamination 4 is additionally or alternatively arranged and aligned in the lower end region, below the stator 2, in particular below the pole shoes 23 of the stator 2, i.e. below the stator laminations 22 and the coils 21, in a plane perpendicular to the axis of rotation z. In one variant, the cogging torque lamination 4 has a multilayered formation and comprises a plurality of cogging torque laminations 4 or cogging torque lamination layers with identical configurations which are arranged one above the other so as to cover one another. The cogging torque lamination 4 and the stator laminations 22 consist of, for example, a magnetically conductive material, in particular of iron (iron lamination).

The stator mount 20 has a bore 25 and bearings 24 arranged therein for receiving or bearing the rotor spindle 32 of the peripherally running rotor 3, said rotor spindle being arranged concentrically with respect to the axis of rotation z. The stator mount 20 is manufactured from a copper alloy, for example, and the rotor spindle 32 is manufactured from stainless steel, for example.

Figure 5:
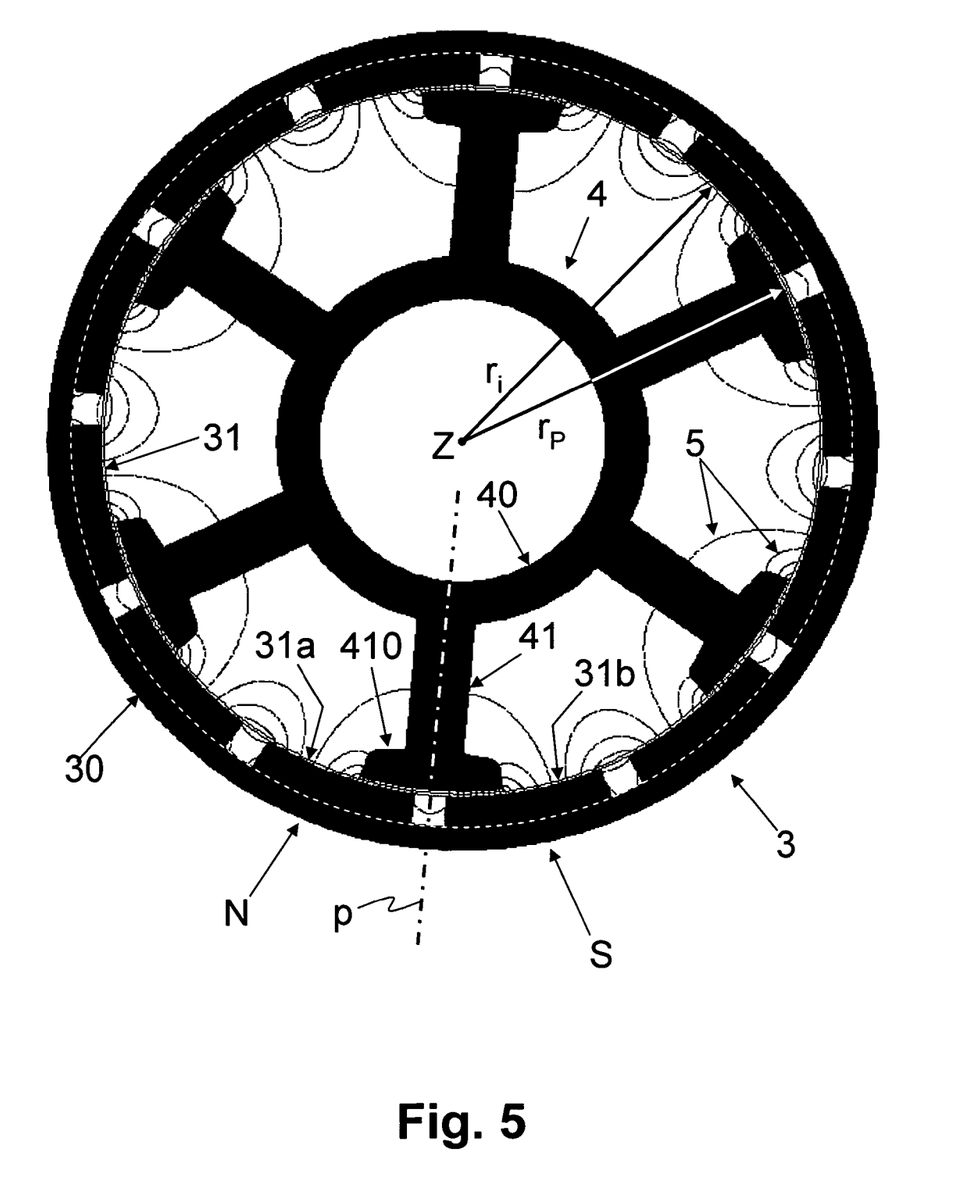
FIG. 5 shows a cross section, perpendicular to the axis of rotation, through the cogging torque lamination and the peripherally running cup rotor with a schematic illustration of the magnetic lines of force in the locking position.

The peripherally running rotor 3 comprises a cup rotor 30, which runs peripherally around the stator 2 and is fixed with a holder 33 on the rotor spindle 32. The cup rotor 30 has an outer diameter of from two to five centimeters, for example, and a height of from two to four centimeters. A plurality of permanent magnets 31 are fitted as peripherally alternating poles to the inner side facing the rotor spindle 32, i.e. to the inner wall of the cup rotor 30, for example twelve alternating magnetic north and south poles N, S, as is shown in FIG. 5. The permanent magnets 31 are preferably manufactured from hard-magnetic materials such as neodymium-iron-boron (NdFeB), for example, and form a hoop or ring running peripherally around the rotor spindle 32 and arranged on the inner wall of the cup rotor 30. Instead of a ring, the magnets can also be arranged discretely in the form of a circle. In FIG. 5, the white, dashed circle schematically illustrates the boundary between the peripherally running cup rotor 30 consisting of sheet iron, for example, and the peripherally running, hoop-shaped multipole permanent-magnet region fitted thereon.

In the assembled state, the rotor 3, as illustrated in FIG. 1, is mounted rotatably with the rotor spindle 32 in the stator mount 20, and the cup rotor 30 is pushed in the manner of a bell over the stator 2 and is freely rotatable about the axis of rotation z and the stator 3.

Figure 4:
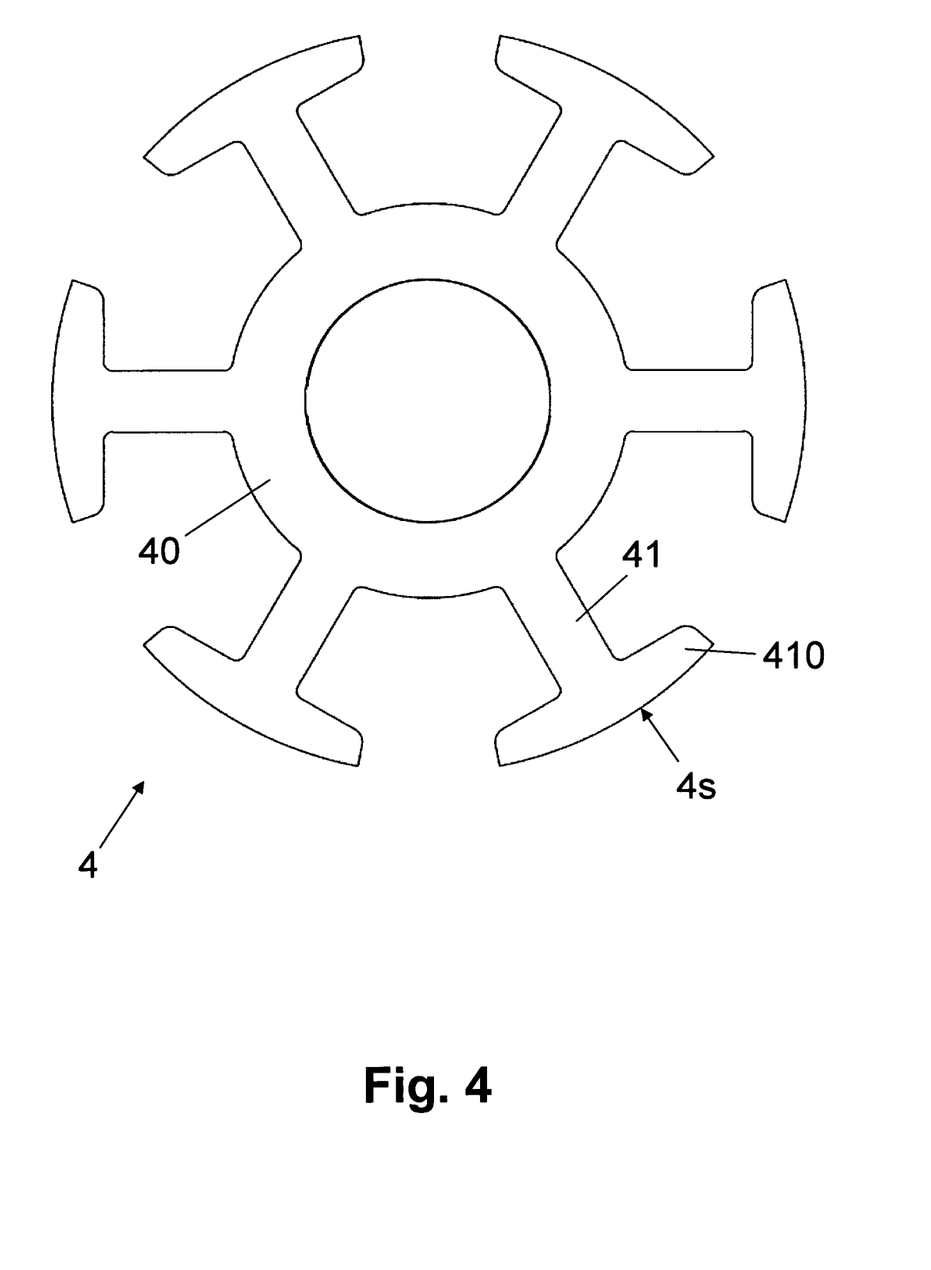
FIG. 4 shows a view from above of an exemplary embodiment of the cogging torque lamination.

As illustrated in FIGS. 4 and 5, the cogging torque lamination 4 comprises an inner support ring 40 and a plurality of pole shoes 41, which are arranged rotationally symmetrically on the outer side of the support ring 40. The cogging torque lamination 4 or the support ring 40 thereof is fixed to the upper (and/or lower) end region of the stator mount 20, as is shown in FIG. 1, with the result that the center Z of the support ring is on the axis of rotation z. In the assembled state, the rotor spindle 32 is thus guided through the opening in the support ring 40.

The pole shoes 41 are configured in the form of a T and each have a longitudinal axis p, which longitudinal axes meet in the center of the support ring 40. The crossbars 410 of the T-shaped pole shoes 41 are arranged on an outer circle, which is concentric to the support ring 40, remote in each case from the support ring 40. As can be seen from FIG. 5, those end sides 4s of the crossbars 410 of the T-shaped pole shoes 41 which are remote from the support ring are rounded from the center Z of the support ring 40 out with a circle radius $r_P$. The circle radius $r_P$ of the rounded end sides 4s of the crossbars 410 is less than the inner radius $r_i$ of the rotor 3 from the center of the rotor spindle 32 (axis of rotation z) up to the permanent magnets 31, 31a, 31b, which are arranged peripherally on the cup rotor 30, with the result that there is an air gap L2 between the pole shoes 41 of the cogging torque lamination 4, in particular between the end sides 4s of the crossbars 410 of the pole shoes 41, and the permanent magnets 31, 31a, 31b, and the cogging torque lamination 4 does not mechanically impede the rotation of the rotor 3.

The number of pole shoes 41 of the cogging torque lamination 4 is preferably an integral divisor or an integral multiple of the number of poles of the peripherally running cup rotor 30. In the example shown in FIG. 5, the rotor 3 has twelve alternating north and south poles N, S on the cup rotor 30 and the cogging torque lamination 4 has six pole shoes 41.

As is illustrated in FIG. 5, the pole shoes 41 are arranged in such a way that their longitudinal axes p in the locking position each come to lie between two adjacent permanent magnets 31a, 31b lying next to one another on the cup rotor 30, with the result that their crossbars 410 each form a magnetic short circuit between two adjacent north and south poles N, S, as can be seen from the illustrated profile of the magnetic lines of force 5 of the permanent magnets 31, 31a, 31b, said magnetic lines of force being influenced by the pole shoes 41. In this case, the crossbar 410 of a pole shoe 41 extends on both sides of the longitudinal axis p in the plane of the cogging torque lamination 4 in each case over a subregion of one of the adjacent permanent magnets 31a, 31b and covers this subregion (with the end side 4s of the crossbar 410) in contactless fashion. In the example shown in FIG. 5, the width of a crossbar 410 is less than the width of a permanent magnet 31, 31a, 31b, with the result that, in the locking position, in each case less than half a permanent magnet 31, 31a, 31b in the plane of the cogging torque lamination 4 is covered in contactless fashion by a crossbar 410 of a pole shoe 41. When there is no rotating magnetic field of the stator 2, i.e. in the deenergized state, when the brushless direct-current motor 1 is not being operated, the magnetic short circuit produced by the pole shoes 41 in this way between the alternating north and south poles N, S is sufficient for generating a cogging torque which inhibits the brushless direct-current motor 1 and brings the peripherally running cup rotor 30 and therefore the rotor 3 into the defined locking position.

As can be seen from FIG. 1, the cogging torque lamination 4 is aligned substantially perpendicular to the permanent magnets 31 and has an end side 4s, which faces the permanent magnets 31 and which, as illustrated in FIG. 4, is located in each case on that side of the crossbar 410 of a pole shoe 41 which is associated with the permanent magnets 31. The cogging torque lamination 4 is arranged with respect to the longitudinal alignment of the axis of rotation z in such a way that it is completely covered on its end side 4s by the permanent magnets 31. That is to say that the entire region of the end side 4s which is delimited by the upper side 4o and lower side 4u of the cogging torque lamination 4 is opposite a permanent-magnet region formed by the permanent magnets 31, only separated by the air gap L2. Owing to the fact that the permanent magnets 31 extend over and beyond the entire region of the end side 4s which is delimited by the upper side 4o and lower side 4u of the cogging torque lamination 4, the cogging torque lamination 4 comes to lie completely in the main magnetic flux of the permanent magnets 31.

During operation, the (moving) magnetic field of the stator coils 21 is in each case aligned via the pole shoes 23 of the stator 2 which are formed by the stator laminations 22. The magnetic circuit is closed, during operation, by a pole shoe 23 of the stator 2 via the air gap L1, the permanent magnets 31 of the rotor 3 and by a return path via the cup rotor 30. Owing to the positioning of the cogging torque lamination 4 above and/or below the stator 2, the cogging torque lamination 4 comes to lie outside this magnetic circuit. This prevents the electrical response of the brushless direct-current motor 1 being substantially influenced by the presence of the cogging torque lamination 4. Since the cogging torque lamination 4 is therefore arranged substantially outside the effective region of the rotating magnetic field produced by the stator 2 during operation, the cogging torque lamination 4 and in particular the pole shoes 41 thereof do not have a power-reducing influence on the brushless direct-current motor 1 during operation.

The invention claimed is:

1. A brushless direct-current motor, comprising a stator and a cup rotor running peripherally around the stator and having a plurality of permanent-magnet poles, characterized by a cogging torque lamination, which is connected and fixed to the stator, with a plurality of pole shoes for generating a cogging torque bringing the peripherally running cup rotor into a locking position, the pole shoes being arranged in such a way that, in the locking position, they each form a magnetic short circuit between two adjacent poles of the peripherally running cup rotor.

2. The brushless direct-current motor as claimed in claim 1, characterized in that the cogging torque lamination is arranged substantially outside a magnetic field produced by the stator during operation.

3. The brushless direct-current motor as claimed in claim 1, characterized in that the cogging torque lamination is arranged at least approximately in a plane perpendicular to the axis of rotation above or below the stator.

4. The brushless direct-current motor as claimed in claim 1, characterized in that the cogging torque lamination comprises a number of pole shoes which corresponds to an integral divisor or multiple of the number of poles of the peripherally running cup rotor.

5. The brushless direct-current motor as claimed in claim 1, characterized in that the pole shoes are configured in the form of a T, and their crossbars are each arranged on a circle which is concentric to the peripherally running cup rotor.

6. The brushless direct-current motor as claimed in claim 1, characterized in that the pole shoes are configured in the form of a T, and their crossbars, in the locking position, each extend over a subregion of the permanent magnets of two adjacent poles of the peripherally running cup rotor.

7. The brushless direct-current motor as claimed in claim 1, characterized in that the stator comprises an axial stator mount, and in that the cogging torque lamination is fitted on the stator mount.

8. The brushless direct-current motor as claimed in claim 1, characterized in that the peripherally running cup rotor comprises permanent magnets including hard-magnetic materials and in that the cogging torque lamination including a magnetically conductive material.

9. The brushless direct-current motor as claimed in claim 1, characterized in that the brushless direct-current motor comprises a plurality of cogging torque laminations with identical configurations arranged one on top of the other so as to cover one another.

10. The brushless direct-current motor as claimed in claim 1, characterized in that the brushless direct-current motor comprises a plurality of cogging torque laminations with identical configurations, at least one of the cogging torque laminations being arranged in a plane perpendicular to the axis of rotation above the stator, and at least one of the cogging torque laminations being arranged in a plane perpendicular to the axis of rotation below the stator.

11. The brushless direct-current motor as claimed in claim 1, characterized in that the cogging torque lamination is arranged completely in the main magnetic flux of the permanent magnets forming the permanent-magnet poles.

12. The brushless direct-current motor as claimed in claim 1, characterized in that the cogging torque lamination is arranged in such a way that it is covered by the permanent magnets of the permanent-magnet poles on the end side of said cogging torque lamination.

\* \* \* \* \*